United States Patent [19]

Whiteford et al.

[11] Patent Number: 5,687,948

[45] Date of Patent: Nov. 18, 1997

[54] VIBRATION ISOLATION SYSTEM INCLUDING A PASSIVE TUNED VIBRATION ABSORBER

[75] Inventors: Gerald P. Whiteford, Waterford; Paul T. Herbst, Erie, both of Pa.

[73] Assignee: Lord Corporation, Cary, N.C.

[21] Appl. No.: 533,824

[22] Filed: Sep. 26, 1995

[51] Int. Cl.$^6$ .................................................. F16M 13/00
[52] U.S. Cl. ........................ 248/635; 248/636; 248/638; 248/557; 248/559; 248/562; 267/140.11; 267/140.13
[58] Field of Search ........................... 248/554, 557, 248/559, 562, 634, 635, 636, 638; 244/17.27, 54; 267/140.11, 140.12, 140.13

[56] References Cited

U.S. PATENT DOCUMENTS

| | | |
|---|---|---|
| 1,819,665 | 8/1931 | Wiltse . |
| 3,487,888 | 1/1970 | Adams et al. ........................ 181/33 |
| 3,490,556 | 1/1970 | Bennett, Jr. et al. ................ 181/33 |
| 4,088,042 | 5/1978 | Desjardins et al. ............ 244/17.27 X |
| 4,150,588 | 4/1979 | Brewer ........................... 248/638 X |
| 4,230,291 | 10/1980 | Marshall, II .................... 248/629 X |
| 4,372,431 | 2/1983 | Desjardins .................... 244/17.27 X |
| 4,381,043 | 4/1983 | Fkushima ........................... 180/300 |
| 4,391,435 | 7/1983 | Pham ................................ 267/140.1 |
| 4,403,762 | 9/1983 | Cogswell, II et al. ................ 248/559 |
| 4,405,101 | 9/1983 | Carlson et al. .................... 244/17.27 |
| 4,440,375 | 4/1984 | Fukushima et al. .................. 248/559 |
| 4,445,662 | 5/1984 | Fukushima et al. .................. 248/559 |
| 4,456,213 | 6/1984 | Fukushima et al. .................. 248/559 |
| 4,514,458 | 4/1985 | Thorn et al. ....................... 428/222 |
| 4,634,081 | 1/1987 | Chee .................................... 244/54 |
| 4,697,781 | 10/1987 | Hamano et al. .................... 248/559 |
| 4,744,547 | 5/1988 | Hartel ............................... 267/141 |
| 4,781,363 | 11/1988 | Braun ............................... 267/225 |
| 4,805,851 | 2/1989 | Herbst ............................... 244/54 |
| 4,811,919 | 3/1989 | Jones ................................. 244/54 |
| 4,974,794 | 12/1990 | Aubry et al. ..................... 244/17.27 |
| 5,052,530 | 10/1991 | Shimazaki ........................ 188/379 |
| 5,065,959 | 11/1991 | Bhatia et al. .................... 248/554 X |
| 5,108,045 | 4/1992 | Law et al. .......................... 241/54 |
| 5,118,051 | 6/1992 | Sheehy et al. ................. 244/17.27 X |
| 5,127,498 | 7/1992 | Lyon et al. ........................ 188/378 |
| 5,127,607 | 7/1992 | McGuire ............................. 244/54 |
| 5,174,552 | 12/1992 | Hodgson et al. ................ 267/140.11 |
| 5,176,339 | 1/1993 | Schmidt ............................. 244/54 |
| 5,197,692 | 3/1993 | Jones et al. ....................... 244/54 |
| 5,351,930 | 10/1994 | Gwinn et al. ...................... 248/557 |
| 5,361,878 | 11/1994 | Borsati ............................. 188/378 |
| 5,374,039 | 12/1994 | Schmidt et al. ................ 267/140.13 |
| 5,388,811 | 2/1995 | Marjoram ...................... 267/140.13 |
| 5,413,320 | 5/1995 | Herbst ........................... 267/140.13 |
| 5,433,422 | 7/1995 | Ross et al. ..................... 267/140.15 |
| 5,474,258 | 12/1995 | Taylor et al. .................... 248/554 X |

FOREIGN PATENT DOCUMENTS

| | | |
|---|---|---|
| 0 131 795 | 1/1985 | European Pat. Off. . |
| 2447776 | 10/1980 | France . |
| 2 080 921 | 6/1981 | United Kingdom . |

*Primary Examiner*—Alvin C. Chin-Shue
*Assistant Examiner*—Richard M. Smith
*Attorney, Agent, or Firm*—Randall S. Wayland

[57] ABSTRACT

An isolation system (20) including the combination of an elastomeric mount (25) for attachment between a structure (24) and a vibrating member (22) and further including at least one passive tuned vibration absorber (TVA) (32) attached in the proximity the elastomeric mount (25) but on the structure side thereof. The resonant frequency $f_r$ of the passive TVA (32) is tuned to a resonant frequency $f_r$ just below the predominant operating frequency $f_o$ of the vibrating member (22), such that the resonance of the tuned vibration absorber (32) makes the structure (24) appear dynamically stiffer. In particular the ratio of $f_r/f_o$ is in the range of between about 0.90 and 0.90. In one embodiment, the passive TVA (32) attaches directly to the inner member (28) of the elastomeric mount (25) and clamps the TVA assembly (43) to the structure (24) and clamps the structure (24) to the elastomeric mount (25). In another embodiment, the passive TVA (32) is clamped to the structure (24) at a point where it cooperates with the elastomeric mount (25) to reduce transmitted vibration, preferably the TVA (32) is attached at a point within last 20% of the end of the beam-like structure (24).

20 Claims, 4 Drawing Sheets

VIBRATION ISOLATION SYSTEM INCLUDING A PASSIVE TUNED VIBRATION ABSORBER

BACKGROUND OF THE INVENTION

The present invention relates to a vibration isolation system for reducing vibration transmitted from a vibrating member into a support structure. Specifically, the invention relates to an isolation system including a passive tuned vibration absorber for reducing vibration transmission at a specific frequency or within a frequency range.

BACKGROUND OF THE INVENTION

Elastomeric engine mounts are known for attaching an engine to structure. Commonly assigned U.S. Pat. Nos. 4,805,851 to Herbst entitled "Turbine Engine Mounting Bracket Assembly", 5,108,045 to Law et al. entitled "Engine Mounting Assembly", 5,176,339 to Schmidt entitled "Resilient Pivot Type Aircraft Mounting", and 5,351,930 to Gwinn entitled "Mountings for Engines and the Like" all describe engine mounting systems for attaching a vibrating engine to structure. The disclosures of each of the abovementioned U.S. patents are hereby incorporated by reference herein. Notably, however, these systems have the drawback that when they are attached to soft (low stiffness) structures, the mounts can be somewhat ineffective.

To operate most effectively, a mount, otherwise referred to as an isolator, must have a very rigid structure to act against. When considering very soft structures, there is very little resistance for the mount to act against. Therefore, because the structure is always arranged in series-spring relationship to the isolator, as the vibrating member acts against the isolator, some of the vibration will necessarily be transmitted into the structure. This dilemma could be solved by making the isolator very soft in comparison to the structure. However, this generally results in unacceptably high static motions across the isolator. Therefore, there is a need for an isolation system which can provide excellent vibration isolation even when attached to a soft structure.

Fluid mounts which utilize fluid inertia to create amplified fluid inertia forces are also known for attaching a vibrating member to a structure. Commonly assigned U.S. Pat. Nos. 4,811,919 to Jones entitled "Volume Compensated Fluid Mount", 5,127,607 to McGuire entitled "Fluid Torque Restraint System with Optimized Fluid Expansion", 5,197,692 to Jones et al. entitled "Adaptive Fluid Mount", 5,374,039 to Schmidt et al. entitled "Fluid-And-Elastomer Device", and 5,413,320 to Herbst entitled "Fluid Mount for Devices such as Engines" describe various fluid mountings which may provide amplified fluid inertia effects to further counteract vibration. The disclosures of each of these fluid mount patents is hereby incorporated by reference herein. Notably, these devices when attached to a soft structure are also somewhat ineffective, as they, too, require a relatively stiff structure to push against.

U.S. Pat. No. 5,174,552 to Hodgson et al. entitled "Fluid Mount with Active Vibration Control" teaches an actively controlled fluid mounting for controlling vibration. Although actively controlled fluid mounts can attach to a soft structure and be very effective, they may be too complex and expensive for some cost-driven applications. Co-pending application Ser. No. 08/322,123 entitled "Active Tuned Vibration Absorber" describes an active vibration absorber which may attach to an inner member of an elastomer mounting and allows isolation over a wide frequency range.

U.S. Pat. No. 4,514,458 to Thorn entitled "Spring-Like Material Formed of Compressed Metallic Wire" describes a spring-like material for use in mountings exposed to very high temperatures. Finally, U.S. Pat. No. 3,487,888 to Adams et al. entitled "Cabin Engine Sound Suppresser" teaches the use of multiple spring-beam type tuned absorbers attached to an aircraft yolk. Furthermore, it is known that certain modern aircraft use metal mesh mountings in combination with spring-beam tuned absorbers. Other known systems utilize spaced-apart elastomeric TVAs attached directly to stiffening ribs (stringers) inside the aircraft fuselage to reduce interior cabin noise.

SUMMARY OF THE INVENTION

In light of the limitations and drawbacks of the prior art, the present invention is a vibration isolation system including, in combination, an elastomer mount and a passive elastomer tuned vibration absorber (TVA) located proximate thereto for reducing vibration that is transmitted from a vibrating member such as an engine into a structure at a predetermined operating frequency or within a limited operating frequency range. The system comprises an elastomeric mount which includes an outer member and means for attaching the outer member to the vibrating member, an inner member and means for attaching the inner member to the structure, and a flexible elastomeric section interconnected therebetween. The flexible elastomer section accommodates relative movement between the inner member and outer member and acts as a primary isolator. The passive TVA exhibits a resonant frequency $f_r$ and is preferably attached directly to the inner member of the elastomeric mount on the structure side thereof or alternatively to the structure proximate said elastomeric mount at a point where it will be effective.

The passive TVA includes a high-density tuning mass, a rigid member disposed adjacent the tuning mass, and an elastomeric spring interconnected between the rigid member and the tuning mass, said elastomer spring and said high-density tuning mass being selected such that the resonant frequency $f_r$ of the spring-mass system is slightly less than said operating frequency $f_o$ and in particular, it is desired that $f_r/f_o$ be in the range of between 0.90 and 0.99 for transmissibilities at resonance of between about 5 and 15.

It is an advantage of the present invention isolation system that it allows effective isolation when incorporating a mount attached to a soft structure.

In another aspect of the invention, it is an advantage of the isolation system that the TVAs include fail-safe features.

In another aspect of the invention, it is an advantage of the isolation system that a TVA assembly may be retrofitted to an existing structure by clamping across and through the structure.

The abovementioned and further novel details, features and advantages of the present invention will become apparent from the accompanying descriptions of the preferred embodiment and the attached drawings.

BRIEF DESCRIPTION OF THE DRAWINGS

The accompanying drawings, which form a part of the specification, illustrate several embodiments of the present invention. The drawings together with the description serve to fully explain the invention. In the drawings:

FIG. 4b is cross-sectional side view of the TVA assembly shown attached to an I-beam-type structure as seen along line 4b—4b in FIG. 4a.

DETAILED DESCRIPTION OF THE PREFERRED EMBODIMENTS

Figure 1:
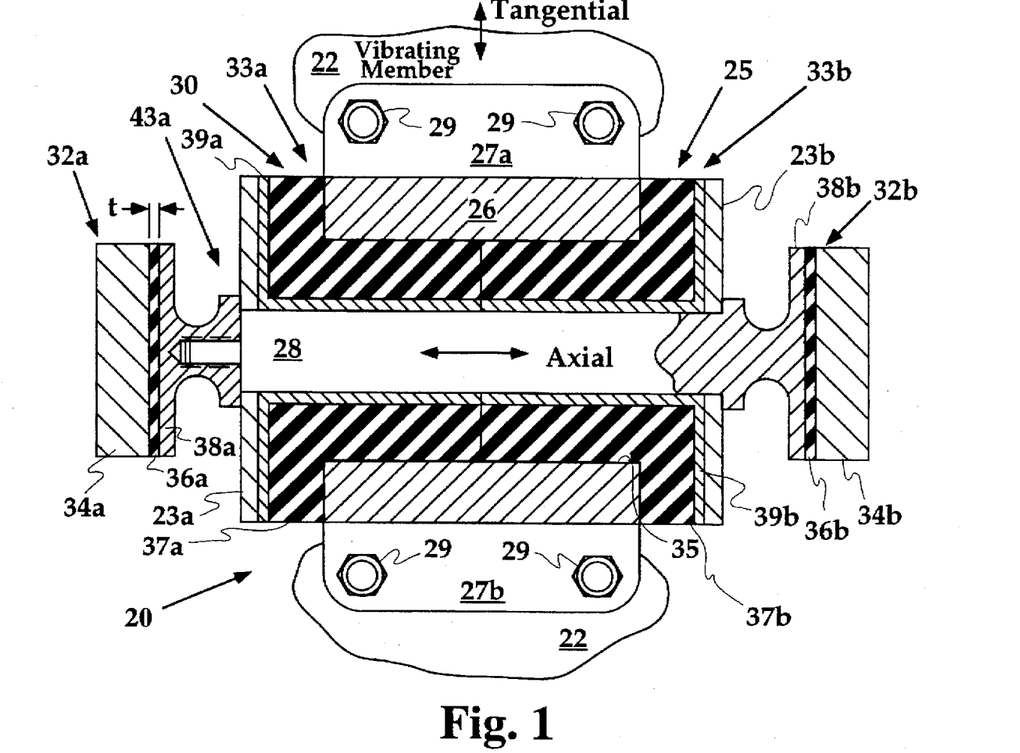
FIG. 1 is a partial cross-sectional top view of the isolation system including an elastomer mount with a TVA assembly attached directly to the inner member, in line therewith, and the TVA assembly clamps the structure to the elastomer mount.

The present invention will be described with reference to the attached drawings wherein like numerals denote like elements when comparing the various embodiments. Referring now to FIG. 1, is shown an isolation system 20 particularly useful for reducing dynamic vibration transmitted between a vibrating member 22 such as an engine, and a supporting structure 24 (FIG. 2) such as an aircraft yolk, spar or beam structure. The isolation system 20 is most effective at a predetermined operating frequency $f_o$ and is also effective within a narrow range about $f_o$. Typically $f_o$ would coincide with the cruise frequency of an aircraft engine. It is desired that the range of isolation would encompass normal variations about cruise such as during takeoff and landing maneuvers. Further, it is particularly advantageous, but not essential, that the isolation system 20 is used where a vibrating member 22 attaches to a relatively soft structure. Moreover, although the isolation system 20 is described with reference to aircraft systems, it should be understood that the isolation system combining an elastomer mount and a TVA will apply where any vibrating member is attached to a soft structure.

The isolation system 20 is comprised of the combination of an elastomeric mount 25 and at least one passive elastomeric tuned vibration absorber (TVA). In this case, two TVAs 32a and 32b, that are matched in resonant frequency, i.e., they are tuned to the same resonant frequency, are preferable. In particular, the elastomeric mount 25 preferably includes an outer member 26 for attachment to the vibrating member 22, an inner member 28 for interconnection to the structure 24 (FIG. 2), and a flexible elastomer section 30, which is preferably a natural rubber or a blend of synthetic elastomer such as polybutadiene and natural rubber, but could be a silicone elastomer or the like if higher temperatures or highly resonant conditions dictate. The flexible elastomer section 30 causes a flexible interconnection between the inner member 28 and outer member 26 and allows relative movement, such as axial, radial or tangential, therebetween. The elastomeric mount 25 acts as a primary isolator between the structure 24 and the vibrating member 22 to initially isolate vibrations transmitted from the vibrating member 22 to the structure 24.

Figure 2:
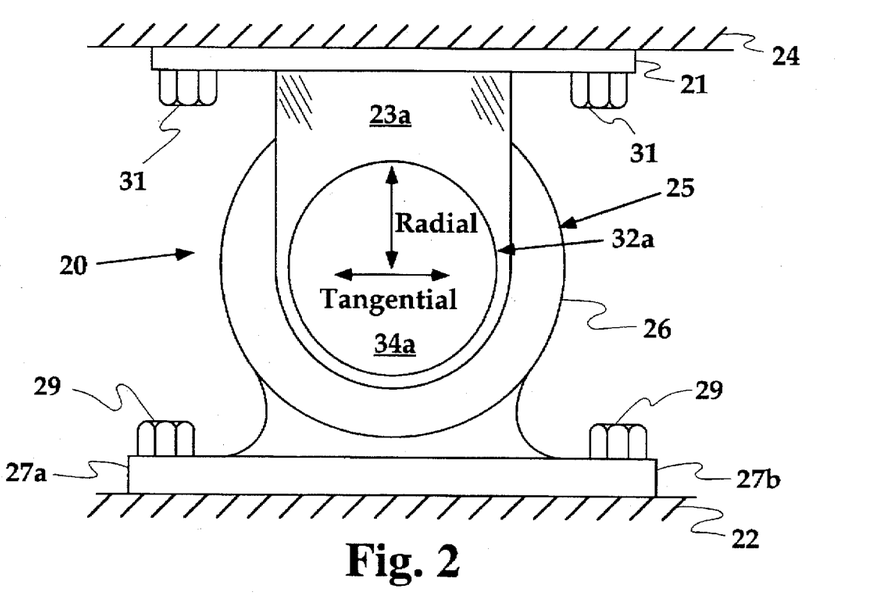
FIG. 2 is an end view of the isolation system shown in FIG. 1.

In this embodiment, the relative movement between the inner member 28 and outer member 26 is accommodated in the tangential, radial (into and out of the paper), and axial directions. Means for attaching the outer member 26 to the vibrating member 22 may include flanges 27a and 27b and fasteners 29 or the like. Means for attaching the inner member 28 to the structure 24 may include clevis portions 23a and 23b, base plate 21 (FIG. 2) and fasteners 31 (FIG. 2). It should be understood the inner member could attach to the vibrating member and the outer member to the structure with the passive TVA attached to the structure side and still fall within the scope of the appended claims.

The isolation system 20 also includes at least one passive TVA attached to structure 24 proximate the elastomeric mount 25. The term proximate preferably encompasses direct interconnection to the structure 24 at the location of the inner member 28 as shown in the FIG. 1 embodiment, as well as attachment to the structure 24 at a point on the structure 24 where the TVA will be effective (See FIG. 4a). The allowable attachment points for effective location of the passive TVA will depend on the stiffness or flexibility of the structure 24. Typically, the softer or more flexible the structure 24, the closer in proximity the TVA will have to be placed to the elastomeric mount 25. The passive TVA is tuned such that it exhibits a resonant frequency $f_r$ which is tuned such it occurs slightly below the most common operating frequency $f_o$. In particular, it is preferable that the ratio of $f_r/f_o$ be in the range of between about 0.90 and 0.99 for systems having transmissibility at resonance of between about 5 and 15 (tan delta of between about 0.067 and 0.2).

In this embodiment, twin, passive, and matched resonant frequency TVAs are used, 32a and 32b which are interconnected and clamped to the structure 24 by attaching directly to the inner member 28 which extends through the elastomeric mount 25. The passive TVAs, 32a and 32b, and inner member 28 make up the passive TVA assembly 43a. It is notable that the TVA assembly 43a clamps the elastomer mount 25 to the clevis portions 23a and 23b causing a direct interconnection to the structure 24. The passive TVAs 32a and 32b both include tuning masses 34a and 34b manufactured from steel or other high density material such as tungsten or tungsten carbide alloy, rigid members 38a and 38b, preferably manufactured from steel, aluminum or the like, disposed adjacent the tuning mass 34a and 34b, and springs 36a and 36b, which are natural rubber, a blend of natural rubber and synthetic elastomer such as polybutadiene, or silicone elastomer and axe interconnected between the substantially parallel surfaces of the rigid members 38a and 38b and tuning masses 34a and 34b.

It is preferable that the springs 36a and 36b be integrally bonded and operate in pure shear between substantially parallel surfaces of the rigid members 38a and 38b and the tuning masses 34a and 34b. The springs 36a and 36b, in this case, shear elastomer sections are placed in pure shear upon encountering vibration of the structure 24 which excites the tuning masses 34a and 34b and causes them to resonate. Preferably, the shear elastomer section of the passive TVAs 32a and 32b are oriented such that any absorber action generated thereby, i.e., the inertial forces are applied both tangentially and/or radially to the vibrating member 22. It is also preferable that the material used for the springs 36a and 36b have a loss factor (tan delta) of between 0.067 and 0.2 and, more preferably about 0.10, and exhibit a dynamic shear modulus of between about 50 psi and 100 psi (G10/10 at 10 hz and 10% strain) with a preferred dynamic shear modulus of about 75 psi. Preferably, the tuning masses 34a and 34b are puck-like and manufactured from stainless steel It should be understood that rigid members 38a and 38b may be separate units which attach to the inner member 28 or be manufactured as part of the inner member 28 as shown on the right side of the inner member 28 of FIG. 1.

In particular, the elastomeric mount 25 shown in FIG. 1 includes two half sections 33a and 33b which are bushing-like center-bonded mounts and received within a cylindrical or tapered bore 35 formed in outer member 26. Included in each half section, 33a and 33b, are inner sleeves 39a and 39b, which are preferably manufactured from steel, and elastomer bushes 37a and 37b. Each elastomer bush, 37a and 37b, is preferably integrally bonded through known bonding processes to the outer surface of inner sleeves 39a and 39b. Flexible elastomer section 30 is formed by elastomer bushes 37a and 37b being inserted in bore 35. Typically, assembly will apply a small amount of precompression to the elastomer mount 25, and thus, to the elastomer bushes 37a and 37b, both radially and axially.

FIG. 2 illustrates an end view of the isolation system 20. The clevis portions 23a and 23b (FIG. 1) attach to the base plate 21 by welding or other attachment means such as bolting. Base plate 21 attaches directly to structure 24 by fasteners 31. It is notable that the plane of operation of the passive TVA 32a is perpendicular to the axial axis of the elastomeric mount 25. In essence, the passive TVAs 32a and 32b act to provide inertia forces in the radial and tangential directions to suppress vibration in both these directions. Furthermore, the TVAs, 32a and 32b, preferably include a thin sandwich-type elastomer section comprising the flexible elastomer section 36a and 36b.

By way of example and not of limitation, the thickness t of the elastomer section falls in the range of between about 0.015 inch and 0.045 inch and preferably has a constant thickness within the layer of about 0.03 inch. The passive TVAs include a mass M of about M=¾ lb. mass and a dynamic shear stiffness of about K=4,785 lbf./in. (1,848,924 Lb mass/ft.) resulting in a resonant frequency $f_r$ of about 250 Hz calculated according to equation 1.

$$f_r = \tfrac{1}{2\pi}\{K/M\}^{1/2} \qquad \text{Equation 1:}$$

The operating frequency $f_o$ for this system is $f_o=265$ hz. The ratio of $f_r/f_o$ is about 0.94. Preferably, a silicone elastomer having a tan delta of about 0.10 would be used for aircraft systems that are subject to significant temperature variations or resonant conditions. This type of TVA assembly 43a would be effective on a soft structure having a dynamic radial structural stiffness of about between 25,000 lbf./in and 100,000 lbf./in. This range would be considered a soft structure for a small commercial fixed wing aircraft, i.e., business jet applications.

Figure 3A:
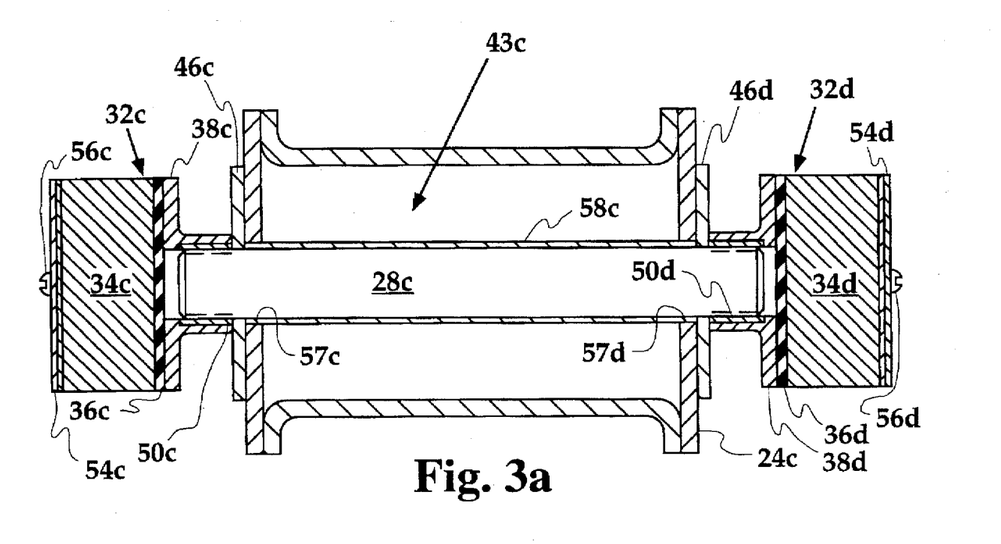
FIG. 3a is cross-sectional side view of an embodiment of TVA assembly showing the details of attachment by clamping across and attachment through a box-beam-type structure.

FIG. 3a illustrates a passive TVA assembly 43c for attachment to a structure 24c in the proximity of the elastomeric mount (not shown). The structure 24c may be a box-beam type shown, an I-beam (FIG. 4b), or the like. The passive TVA assembly 43c comprises two passive TVAs 32c and 32d which are interconnected by inner member 28c which acts as the means for clamping the passive TVA assembly 43c directly to, and preferably through, the structure 24c in the proximity of the elastomeric mount (not shown). The passive TVA assembly 43c preferably includes damping plates 46c and 46d to distribute the clamping loads over the surface of the structure 24c. The clamping plates 46c and 46d may be steel, aluminum or the like. Wrench slots (see FIG. 4b) or a hex may be formed on the shaft of the rigid members 38c and 38d to aid in installation and torqueing of the passive TVAs, 32c and 32d. Having a passive TVA assembly 43c which clamps through the structure 24c has the advantage of reducing the bending moments imparted on the structure 24c as compared to beam like TVAs that bolt into a threaded hole formed in the structure. Moreover, it allows for retrofitting of the passive TVA on systems which already incorporate an elastomeric mount.

In the FIG. 3a embodiment, the passive TVAs 32c and 32d include rigid members 38c and 38d which have coiled threads 50c and 50d inserted therein. The coiled threads 50c and 50d are preferably self-locking threaded inserts. Wafers 54c and 54d attach to masses 34c and 34d by way of fastening means such as screws 56c and 56d shown, and act as adjustment masses to finely tune the resonant frequency $f_r$ of the passive TVA assembly 43c. Wafers 54c and 54d are preferably manufactured by stamping from a steel plate. Alternatively, wafers 54c and 54d could be glued to ends of masses 34c and 34d.

Sleeve 58c inserts in the through bores 57c and 57d formed in structure 24c. Bores 57c and 57d may be lightening holes already formed in the structure 24c, or may be added to the existing structure to accommodate the passive TVA assembly 43c. Sleeve 58c serves as means for tarring up play and acts as a bushing-like element for properly aligning the passive TVA assembly 43c relative to the structure 24c. Sleeve 58c is preferably manufactured from a nylon, Teflon or other low-friction material or it could be metal as well. The inner member 28c is inserted through the structure 24c and passive TVAs 32c and 32d are threaded and secured onto the ends thereof. As installed, clamping plates 46c and 46d exert a clamping force on the surface of structure 24c to rigidly fasten the passive TVA assembly 43c to the structure 24c. In this way, any inertia forces generated by the passive TVAs 32c and 32d are directly transferred to the structure 24c to suppress vibration of the structure 24c or increase the impedance of the structure 24 and make it appear dynamically stiff to the elastomer mount.

Figure 3B:
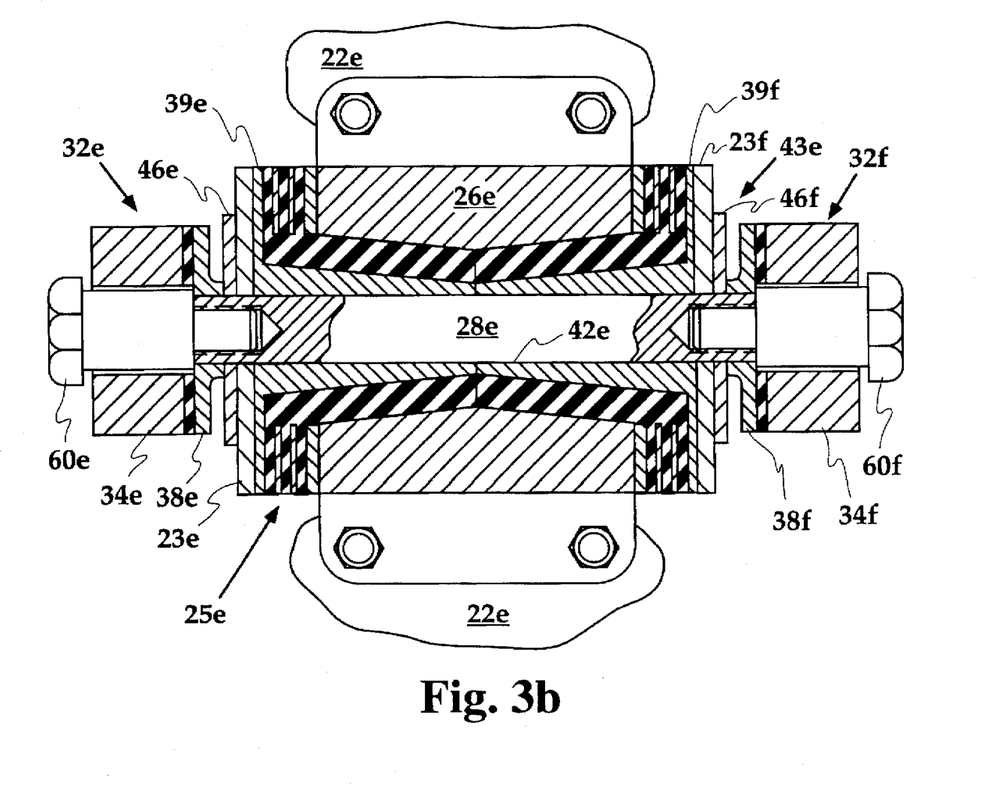
FIG. 3b is partial cross-sectional top view of another embodiment of isolation system where multiple and matched TVAs are located in the proximity of the conical and laminated elastomer-and-shim elastomer mount and where the TVAs include fail-safe retention features.

FIG. 3b illustrates another embodiment of passive TVA assembly 43e wherein the passive TVAs 32e and 32f are attached directly to the inner member 28e by way of retention bolts 60e and 60f. In this embodiment, the TVA's 32e and 32f clamp the structure to the mount 25e inserting through bore 42e and by clamping clevis portions 23e and 23f to the elastomer mount 25e. In this embodiment, the inner member 28e would be made up of the threaded member 28e and inner sleeves 39e and 39f. The retention bolts 60e and 60f retain the masses 34e and 34f should the elastomer bond separate between the masses 34e and 34f and rigid members 38e and 38f. The head of the retention bolts 60e and 60f provide fail-safe retention by being larger than the bore in the passive TVA masses 34e and 34f. This fail-safe retention prevents masses 34e and 34f from falling into the engine compartment in aircraft applications. The elastomeric mount 25e is similar to that described in FIG. 1. The difference is that the elastomer mount 25e includes tapered conical sections and laminated elastomer-and-shim construction. This elastomer mount is available from Lord Corporation as part number LM-420-SA5-1.

Figure 4A:
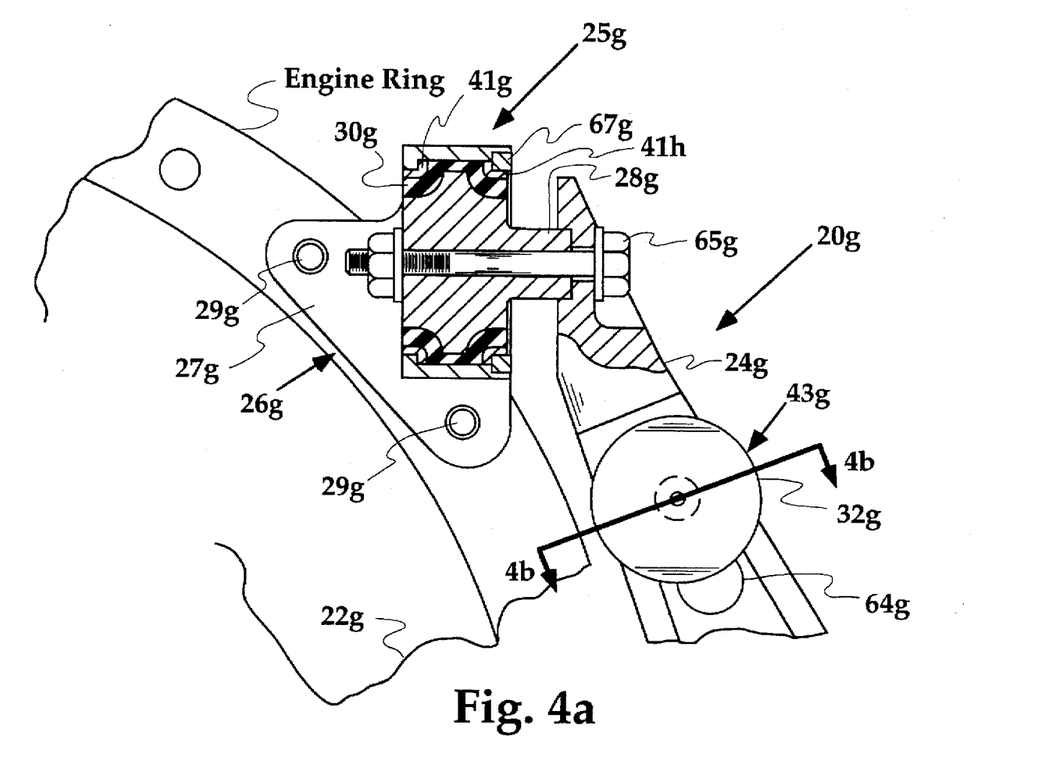
FIG. 4a is partially cross-sectioned frontal view of another embodiment of the isolation system where the TVA assembly is retrofitted and attached to an I-beam-type structure in the proximity of the elastomer mount by clamping to the I-beam-type structure through a lightening hole formed therein.

FIG. 4a illustrates another embodiment of isolation system 20g which includes, in combination, an elastomeric mount 25g and passive TVA assembly 43g including at least one passive TVA 32g and preferably two passive TVAs. Passive TVA 32g and preferable passive TVA assembly 43g are located in the proximity of elastomeric mount 25g. Where the passive TVA 32g is located, as well as the stiffness of the structure, will determine the TVA effectiveness. The passive TVA 32g is most effective when attached to the inner member at the location of the elastomeric mount 25g. However, if the passive TVA 32g must be attached to the structure 24g at some location other than at the elastomeric mount 25g, as in the FIG. 4a embodiment, then the passive TVA 32g should be placed as proximate as possible to the elastomeric mount 25g but on the structure side thereof. The degree of proximity will be described with reference to FIG. 5.

In particular, the elastomeric mounting 25g in this FIG. 4a embodiment includes an outer member 26g for attaching to the engine ring of a vibrating member 22g by fasteners 29g, an inner member 28g for attaching to the I-beam structure 24g and a flexible elastomer section 30g which is a tube form-type elastomer section. The elastomer mount 25g is slipped into position between two adjacent engine rings. Flange 27g attaches to one engine ring by fasteners 29g and a mirror image of the half section attaches to the other adjacent engine ring (not shown) in a similar fashion. Outer sleeves 41g and 41h are bonded to flexible elastomer section 30g and are retained within the confines of the pocket formed in the outer member 26g by threaded ring 67g which threads into the outer member 26g. Inner member 28g is bonded to flexible elastomer section 30g and is attached to I-beam structure 24g by way of fastener 65g shown. The TVA assembly 43g clamps to the structure 24g in such a fashion as to allow retrofitting of the TVA assembly 43g onto existing structures and systems which already include mounts. In particular, the TVA assembly 43g will clamp to the structure 24g in the proximity of the elastomer mount 25g through a lightening hole such as 64g shown. The TVA assembly 43g is actually clamped though a smaller lightening hole adjacent to lightening hole 64g.

Figure 4B:
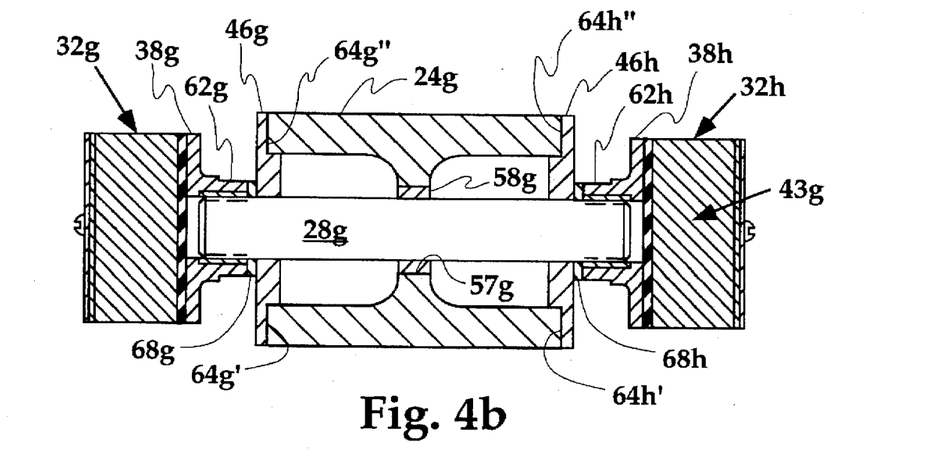

FIG. 4b illustrates a partial cross-sectional side view of the passive TVA assembly 43g shown attached to the I-beam like structure 24g. The passive TVA assembly 43g includes passive TVAs 32g and 32h securely attached to inner member 28g which has threads formed on the ends thereof. Wrench slots 62g and 62h help the installer torque the assembly properly. Hexes may alternatively be formed on the shafts of rigid members 38g and 38h. Preferably, a sleeve 58g is installed into the structure 24g to accommodate and align the passive TVA assembly 43g and prevent metal-to-metal contact between the inner member 28g and the structure 24g. The bore 57g is preferably a lightening or weight-reducing hole formed in the structure 24g thereby requiring no modification to the structure 24g to install the passive TVA assembly 43g. Clamping members 46g and 46h may have slots 64g', 64g' and 64h', 64h' formed thereon for being received within the I-section of the I-beam and preventing rotation of the TVA assembly 43g relative to the structure 24g once properly torqued. Proper torquing will apply enough force to the I-beam structure 24g to clamp the TVA assembly 43g to the structure 24g through the through bore 57g formed therein. Locking threaded inserts prevent the TVAs 32g and 32h from unscrewing from the inner member 28g. Further, lock washers 68g and 68h may be used to add additional locking or used as the primary locking mechanism.

Figure 5:
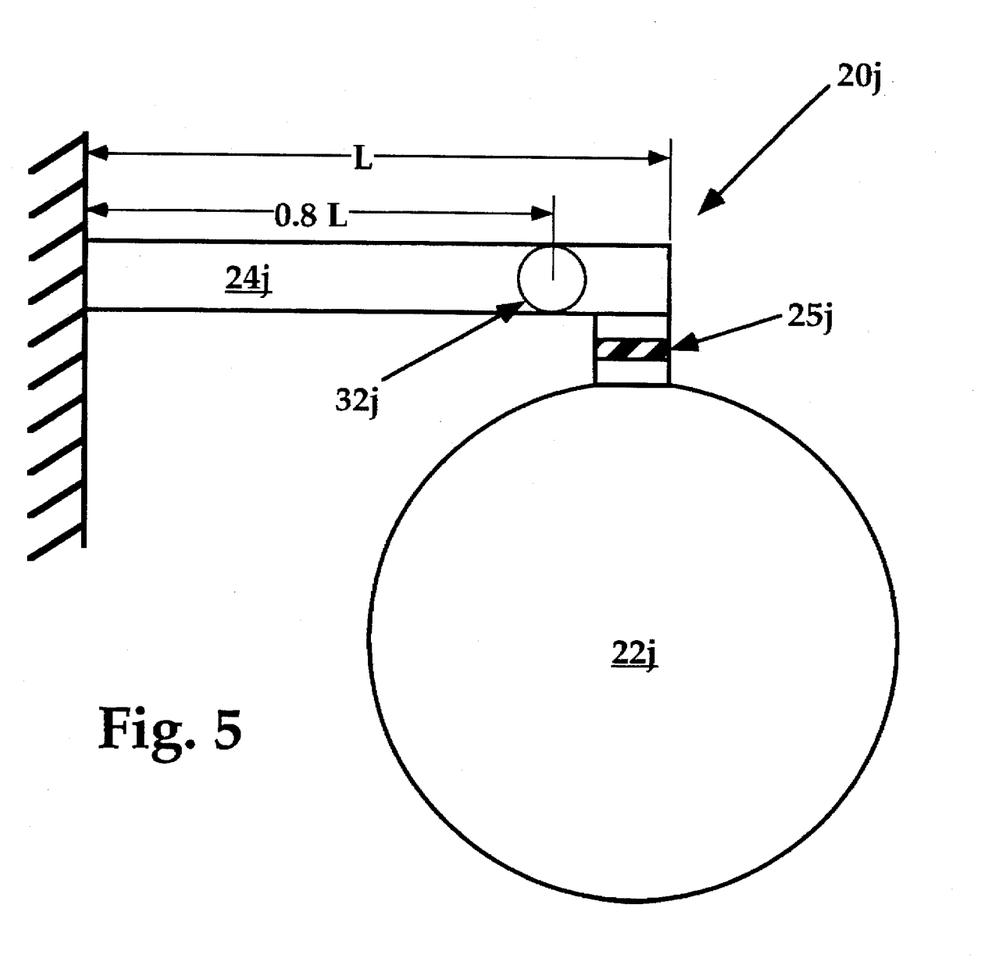
FIG. 5 is schematic side view of the present invention isolation system illustrating the location of the TVA relative to the elastomer mount on a flexible beam.

FIG. 5 illustrates a schematic side view of an isolation system 20j. If the structure 24j is a beam-like structure, as are most aircraft installations, having a length L, then it is preferable to place the passive TVA 32j on the structure 24j on the last 20% of the beam length L. Even when placed at 0.8 L adjacent the end of the beam at the location of the elastomer mount 25j, the passive TVA is only approximately 50% effective as compared to when it is placed on the end of the beam 24j. Therefore, it is desired to place the TVA 32j at or beyond 0.8 L proximate the elastomer mount 25j. Furthermore, analysis has determined that it is preferable that the mount dynamic stiffness and the structure dynamic stiffness be approximately equal in magnitude for optimal effectiveness of the TVA 32j.

In summary, the present invention provides a novel isolation system which includes, in combination, an elastomeric mount and at least one passive TVA, and preferably a passive TVA assembly, located in the proximity of said elastomeric mount for providing improved isolation at an operating frequency or within a narrow operating frequency range. The elastomeric mount includes an inner member for connecting to the structure, an outer member for connecting to a vibrating member such as an engine, and a flexible elastomer section forming a flexible interconnection therebetween. The passive TVA includes a tuning mass, a rigid member, and an elastomer spring therebetween. The passive TVA's resonant frequency $f_r$ is tuned to a frequency just below the predominant operating frequency $f_o$ and preferably fr/of is between about 0.99 and 0.90. Preferably, the passive elastomer TVA is attached directly to the inner member of the elastomeric mount, but may, alternatively, be attached to the flexible structure at a point where it will be effective by clamping thereto. The isolation system has the key advantage of allowing an elastomeric mount to be much more effective when attaching to a soft structure, whereas, prior art systems had limited effectiveness when so attached.

While several embodiments of the present invention have been described in detail, various modifications, alterations and changes may be made by those of ordinary skill in the art without departing from the spirit and scope of the present invention as defined in the appended claims. It is intended that all such modifications, alterations and changes fall within the appended claims and be considered part of the present invention.

What is claimed is:

1. An isolation system for reducing a vibration transmitted from a vibrating member such as an engine into a structure at an operating frequency $f_o$ or within a narrow frequency range about $f_o$, said isolation system comprising:

(a) an elastomeric mount including:
  (i) an outer member with means for attachment to said vibrating member;
  (ii) an inner member with means for attachment to said structure;
  (iii) a flexible elastomer section interconnected between said outer member and said inner member thereby allowing relative movement between said inner member and said outer member and static load carrying therebetween; and (b) two passive tuned vibration absorbers each exhibiting a same resonant frequency $f_r$ which are attached directly to said inner member of said elastomeric mount, each said passive tuned vibration absorber including:
  (i) a free-floating tuning mass;
  (ii) a rigid member disposed adjacent said tuning mass and directly attached to said inner member;

(iii) a shear elastomer spring interconnected between said rigid member and said tuning mass, said shear elastomer spring and said tuning mass being selected such that said resonant frequency $f_r$ is less than said operating frequency $f_o$, said shear elastomer spring stressed in operation to be loaded in substantially pure shear and said resonant frequency $f_r$ of said two passive vibration absorbers being tuned such that a ratio of $f_r/f_o$ is in the range between about 0.90 and 0.99.

2. An isolation system of claim 1 wherein said flexible elastomer section of said elastomeric mount includes one from the group consisting of an elastomer bush section and an elastomer tube form section.

3. An isolation system of claim 2, wherein said two passive tuned vibration absorbers attach to said inner member by threading, said inner member being received through a bore formed in said elastomeric mount.

4. An isolation system of claim 1, wherein said flexible elastomer section is manufactured from one of a natural rubber elastomer and a blend of natural rubber elastomer and synthetic elastomer.

5. An isolation system of claim 1, wherein said two passive tuned vibration absorbers are adapted to be attached to a soft structure proximate said elastomeric mount, said structure having a stiffness less than 100,000 lb./in.

6. An isolation system of claim 1, wherein said free-floating tuning mass is puck-like and is bonded to said shear elastomer spring, and said free-floating tuning mass is retained by a retention bolt providing a fail-safe retention feature.

7. In combination with a vibrating member supported relative to a structure, an isolation system for reducing a vibration transmitted from said vibrating member such as an engine to said structure at an operating frequency fo or within a narrow frequency range about fo, said isolation system comprising:
(a) an elastomeric mount interconnecting said vibrating member and said structure, including:
  (i) an outer member with means for attachment to said vibrating member;
  (ii) an inner member with means for attachment to said structure;
  (iii) a flexible elastomer section interconnected between said outer member and said inner member thereby allowing relative movement and isolating vibrations therebetween; and
(b) a passive tuned vibration absorber exhibiting a resonant frequency $f_r$ directly attached and clamped to said structure in a location proximate to said elastomeric mount, said passive tuned vibration absorber including:
  (i) a free-floating tuning mass having a particular mass;
  (ii) a rigid member disposed adjacent said tuning mass;
  (iii) an elastomer spring exhibiting a stiffness interconnected between said rigid member and said free-floating turning mass, said stiffness of said elastomer spring and said particular mass of said free-floating tuning mass being selected to produce a resonant frequency $f_r$ of said passive tuned vibration absorber, said resonant frequency $f_r$ being tuned such that said resonant frequency $f_r$ is less than said operating frequency $f_o$ and a ratio of $f_r/f_o$ is between the range of about 0.90 and 0.99.

8. An isolation system of claim 1 wherein said passive tuned vibration absorber attaches directly to said inner member of said elastomeric mount by threading thereon which causes a clamping of said passive tuned vibration absorber to said structure and also attaches said elastomeric mount to said structure.

9. An isolation system of claim 1 wherein a first passive vibration absorber and a second passive tuned vibration absorber are attached to said structure proximate to said elastomeric mount, said first and said second passive tuned vibration absorber being matched in that said second passive tuned vibration absorber exhibits a resonant frequency $f_r$ substantially equal to a resonant frequency $f_r$ of said first passive tuned vibration absorber.

10. An isolation system of claim 1 wherein said passive tuned vibration absorber attaches to said structure proximate to said elastomeric mount and said structure has a low structural stiffness below about 100,000 lb./in.

11. An isolation system of claim 1 wherein said elastomer spring of said passive tuned vibration absorber undergoes loading predominantly in pure shear upon being excited by said vibration and said free-floating tuning mass is substantially puck-like in shape.

12. An isolation system of claim 1 wherein said passive tuned vibration absorber is included within a passive tuned vibration absorber assembly which includes two matched passive tuned vibration absorbers, and wherein said passive tuned vibration absorber assembly is clamped to said structure through a through bore formed in said structure in a location proximate said elastomeric mount.

13. An isolation system of claim 12 wherein said through bore formed in said structure is a lightening hole formed therein.

14. An isolation system of claim 1 wherein said free-floating tuning mass of said passive tuned vibration absorber is retained by a retention bolt attached to said inner member to form a fail-safe connection.

15. In combination with a vibrating member supported relative to a beam-like structure, an isolation system for reducing a vibration transmitted at an operating frequency fo from said vibrating member into said beam-like structure having a beam length L and a beam end, said isolation system comprising the combination of:
(a) an elastomeric mount attached adjacent said beam end, including:
  (i) an outer member with means for attachment to said vibrating member;
  (ii) an inner member with means for attachment to said structure;
  (iii) a flexible elastomer section interconnected between said outer member and said inner member thereby allowing relative movement between said inner member and said outer member and support of loads therebetween; and
(b) a passive tuned absorber assembly including two passive tuned vibration absorbers each exhibiting a resonant frequency $f_r$, and a pin-like inner member attached to said two passive tuned vibration absorbers, said tuned absorber assembly being clamped through a through bore formed in said beam-like structure proximate said elastomeric mount and within 0.2 L of said beam end of said beam-like structure, each said passive tuned vibration absorber including:
 (i) a flee-floating tuning mass;
 (ii) a rigid member disposed adjacent said tuning mass;
 (iii) an elastomer spring interconnected between said rigid member and said free-floating tuning mass, said elastomer spring and said free-floating tuning mass being selected such that said resonant frequency $f_r$ is less than said operating frequency $f_o$ and a ratio of $f_r/f_o$ of said tuned absorber assembly is between the range of about 0.90 and 0.99.

16. An isolation system of claim 15 wherein said flee-floating tuning mass is puck-like in shape and is bonded to said shear elastomer spring which operates in substantially pure shear and which is manufactured from a silicone material having a tan delta in the range of between about 0.067 and 0.20.

17. An isolation system of claim 15 wherein said passive tuned vibration absorber assembly attaches to a soft structure having a stiffness of less than about 100,000 lb./in.

18. An isolation system of claim 15 wherein said flexible elastomer section of said elastomeric mount includes one from the group consisting of an elastomer bush section and an elastomer tube form section.

19. An isolation system of claim 15 wherein each said free-floating tuning mass of each said passive tuned vibration absorber is retained by a retention bolt attached to said pin-like inner member to form a fail-safe connection.

20. An isolation system of claim 15, wherein said flexible elastomer section is manufactured from one of a natural rubber elastomer and a blend of natural rubber elastomer and synthetic elastomer.

* * * * *